J. A. BARNARD.
NUT LOCK.
APPLICATION FILED MAR. 12, 1915.

1,197,429.

Patented Sept. 5, 1916.

Inventor
J. A. Barnard,

Witnesses

UNITED STATES PATENT OFFICE.

JOHN A. BARNARD, OF WILLIAMSON, WEST VIRGINIA.

NUT-LOCK.

1,197,429.  Specification of Letters Patent.  Patented Sept. 5, 1916.

Application filed March 12, 1915. Serial No. 13,886.

*To all whom it may concern:*

Be it known that I, JOHN A. BARNARD, a citizen of the United States, residing at Williamson, in the county of Mingo and State of West Virginia, have invented certain new and useful Improvements in Nut-Locks; and I do hereby declare the following to be a full, clear, and exact description of the invention, such as will enable others skilled in the art to which it appertains to make and use the same.

This invention has for its object to provide a simple, efficient and inexpensive nut lock for reliably locking a nut against rotational movement upon a bolt and including essentially a locking member of annular formation inclosed by an annular flange formed upon the outer surface of the nut and having locking engagement with the nut and the bolt.

Another object is the provision of a cap or closure for excluding dust and dirt from the locking member and for protecting the latter.

Figure 1:
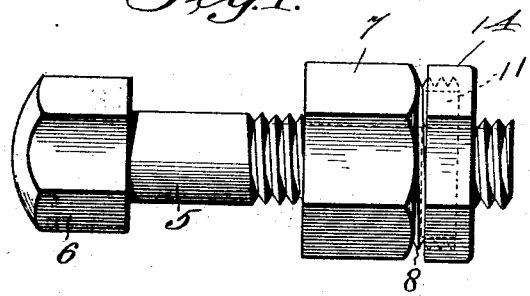
Figure 2:
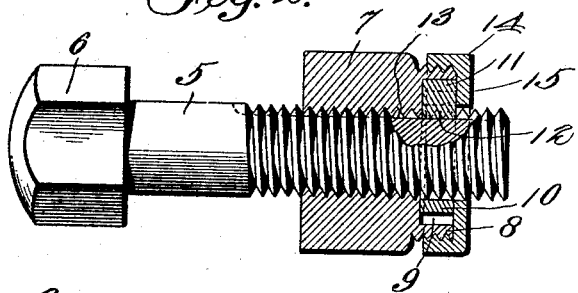
Figure 3:
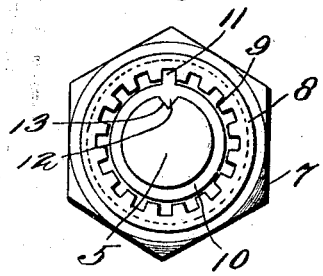
Figure 4:
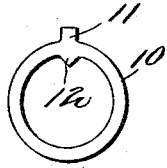
Figure 5:
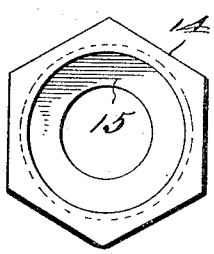

With these and other objects in view, the invention consists in the novel construction, arrangement and formation of parts as will be hereinafter specifically described, claimed and illustrated in the accompanying drawing, in which:

Figure 1 represents a side elevation of the improved nut lock. Fig. 2 represents a similar view, illustrating the nut lock in section. Fig. 3 represents an end elevation of the bolt and nut lock, showing the cap removed. Fig. 4 represents a side elevation of the locking member removed. Fig. 5 represents a plan view of the cap removed.

Referring to the drawing in detail, wherein similar reference numerals designate corresponding parts throughout the several views, the numeral 5 indicates the shank of a bolt of the usual or any preferred construction having screwthreads extending inwardly from one end and a head 6 at the opposite end. A nut 7 is threaded upon the shank 5 and is provided upon its outer face with an annular flange 8 arranged concentrically with relation to the internally screwthreaded bore of the nut. The flange 8 is formed with external screwthreads and spaced internal teeth 9.

The locking member designated generally by the numeral 10 is of annular formation and engaged upon the bolt shank 5 and inclosed by the annular flange 8. A rectangular tooth 11 is formed integral with the locking member 10 and is directed outwardly for engagement between the teeth 9 of the annular flange 8, and an internal tapered tooth 12 formed upon the locking member and adapted to engage within a correspondingly shaped groove or channel 13 formed longitudinally in the bolt shank. An internally screwthreaded cap 14 is removably threaded upon the annular flange 8 and is provided with an angularly directed annular flange 15 overlying the flange 8 and the locking member 10, as clearly illustrated in Fig. 2.

In use, the nut 7 is advanced to the desired position upon the bolt and the locking member 10 is moved upwardly upon the shank until the external tooth 11 thereof engages between two of the teeth 9 of the nut, thus reliably locking the latter against rotational movement upon the bolt. The cap 14 is subsequently fitted upon the flange 8 and effectively protects the locking member against mutilation or other injury thereto.

What I claim is:

In combination, a bolt having a longitudinal groove, a nut threaded upon said bolt, an external annular flange on said nut, an annular locking member inclosed by said flange, an inwardly directed tooth carried by said locking member engaged within said groove, a plurality of inwardly directed teeth on said flange, a tooth on said locking member arranged in radial line with the inwardly directed tooth and engaged between the first-mentioned teeth, and a cap removably secured upon said nut provided with an inwardly directed flange overlying and securing said locking member in position in said flange.

In testimony whereof I affix my signature in presence of two witnesses.

JOHN A. BARNARD.

Witnesses:
 A. W. THOMPSON,
 BEN MAYNARD.

Copies of this patent may be obtained for five cents each, by addressing the "Commissioner of Patents, Washington, D. C."